United States Patent
Zeng et al.

(10) Patent No.: US 12,047,009 B2
(45) Date of Patent: Jul. 23, 2024

(54) FLYBACK CONVERTER, SYNCHRONOUS RECTIFICATION CONTROL CIRCUIT AND CONTROL METHOD THEREOF

(71) Applicant: Shenzhen Kiwi Instruments Corporation, Shenzhen (CN)

(72) Inventors: Qiang Zeng, Hangzhou (CN); Peng Wen, Hangzhou (CN); Yutai Fu, Hangzhou (CN)

(73) Assignee: Shenzhen Kiwi Instruments Corporation, Shenzhen (CN)

( * ) Notice: Subject to any disclaimer, the term of this patent is extended or adjusted under 35 U.S.C. 154(b) by 217 days.

(21) Appl. No.: 17/845,977

(22) Filed: Jun. 21, 2022

(65) Prior Publication Data
US 2022/0321020 A1 Oct. 6, 2022

(30) Foreign Application Priority Data
Jun. 22, 2021 (CN) .......................... 202110688655.2

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0029* (2021.05); *H02M 1/08* (2013.01)

(58) Field of Classification Search
CPC ............. H02M 3/33592; H02M 3/335; H02M 1/0029; H02M 1/08
See application file for complete search history.

(56) References Cited

U.S. PATENT DOCUMENTS

| | | | | |
|---|---|---|---|---|
| 10,063,131 B2 * | 8/2018 | Yang | ................. | H02M 3/33507 |
| 10,418,905 B1 * | 9/2019 | Perry | .................... | H02M 1/088 |
| 10,819,211 B2 * | 10/2020 | Yang | ................. | H02M 3/33507 |
| 11,309,785 B2 * | 4/2022 | Yu | ....................... | H02M 1/0025 |
| 11,523,479 B2 * | 12/2022 | Zhang | .................... | H05B 45/14 |
| 11,817,792 B2 * | 11/2023 | Su | ..................... | H02M 3/33592 |
| 2016/0087543 A1 | 3/2016 | Jin et al. | | |

FOREIGN PATENT DOCUMENTS

| | | |
|---|---|---|
| CN | 105978341 | 9/2016 |
| CN | 111404403 | 7/2020 |
| CN | 112217399 | 1/2021 |
| CN | 112865541 | 5/2021 |
| CN | 113141101 | 7/2021 |

* cited by examiner

*Primary Examiner* — Adolf D Berhane
(74) *Attorney, Agent, or Firm* — Muncy, Geissler, Olds & Lowe, P.C.

(57) ABSTRACT

A synchronous rectification control circuit has a turn-on detection circuit. The turn-on detection circuit has a slope detection circuit and a threshold generation circuit. The slope detection circuit generates a slope representation signal representing a falling slope of the detection signal. The threshold generation circuit generates a threshold signal by selecting one of threshold reference signals according to a driving signal. The turn-on detection circuit generates a comparison result signal by comparing the slope representation signal and the threshold signal for controlling the switch state of the synchronous rectification transistor.

19 Claims, 4 Drawing Sheets

FLYBACK CONVERTER, SYNCHRONOUS RECTIFICATION CONTROL CIRCUIT AND CONTROL METHOD THEREOF

CROSS-REFERENCE TO RELATED APPLICATIONS

This application claims priority to and the benefit of Chinese Patent Applications No. 202110688655.2, filed on Jun. 22, 2021, which are incorporated herein by reference in its entirety.

TECHNICAL FIELD

The present invention relates generally to electronic circuit, and more particularly but not exclusively relates to flyback converter, synchronous rectification control circuit and control method thereof.

BACKGROUND

In synchronous rectification technology, metal oxide semiconductor field effect transistor (i.e. MOSFET) is typically used as synchronous rectification transistor SR to replace rectification diode to reduce the rectification loss. At present, the synchronous rectification technology has been widely used in industrial power supply, consumer electronics and other fields. FIG. 1 illustrates a circuit diagram of a flyback converter which takes the synchronous rectification transistor as the secondary side rectifier. It can effectively reduce the rectification power loss by using the synchronous rectification transistor with very low on-resistance to replace the conventional rectification diode.

SUMMARY

In one embodiment, a synchronous rectification control circuit is provided, the synchronous rectification control circuit is configured to generate a driving signal for controlling the switch state of a synchronous rectification transistor, the synchronous rectification control circuit includes a turn-on detection circuit, the turn-on detection circuit comprises: a slope detection circuit having an input and an output, the input of the slope detection circuit configured to receive a detection signal representing a voltage difference between two ends of the synchronous rectification transistor, the slope detection circuit configured to generate a slope representation signal representing a falling slope of the detection signal according to the detection signal; and a threshold generation circuit having an input and an output, the input of the threshold generation circuit configured to receive the driving signal, the threshold generation circuit configured to generate a threshold signal by selecting one of threshold reference signals in accordance with the driving signal, wherein the threshold reference signals include at least a first threshold reference signal and a second threshold reference signal; wherein the turn-on detection circuit is configured to generate a comparison result signal by comparing the slope representation signal and the threshold signal for controlling the switch state of the synchronous rectification transistor.

In another embodiment, a flyback converter is provided, the flyback converter comprises a primary side circuit and a secondary side circuit, wherein the secondary side circuit comprises a secondary side winding and the synchronous rectification control circuit.

In yet another embodiment, a synchronous rectification control method comprises: receiving a detection signal representing a voltage difference between two ends of a synchronous rectification transistor, generating a slope representation signal representing a falling slope of the detection signal according to the detection signal; receiving a driving signal, generating a threshold signal by selecting one of threshold reference signals in accordance with the driving signal, the threshold reference signals include at least a first threshold reference signal and a second threshold reference signal; and generating a comparison result signal by comparing the slope representation signal and the threshold signal for controlling the switch state of the synchronous rectification transistor.

BRIEF DESCRIPTION OF THE DRAWINGS

Non-limiting and non-exhaustive embodiments are described with reference to the following drawings. The drawings are only for illustration purpose. Usually, the drawings only show part of the devices of the embodiments.

DETAILED DESCRIPTION

Reference will now be made in detail to the preferred embodiments of the application, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Throughout the specification and claims, the term "couple" as used herein, is defined as either directly, or indirectly connecting one to another via intermediary such as via electrical conducting materials which may have resistance, parasitic inductance or capacitance, or via other material(s) or component(s) as would be known to person skilled in the art without departure from the spirit and scope of the invention as defined by the appended claims.

Figure 1:
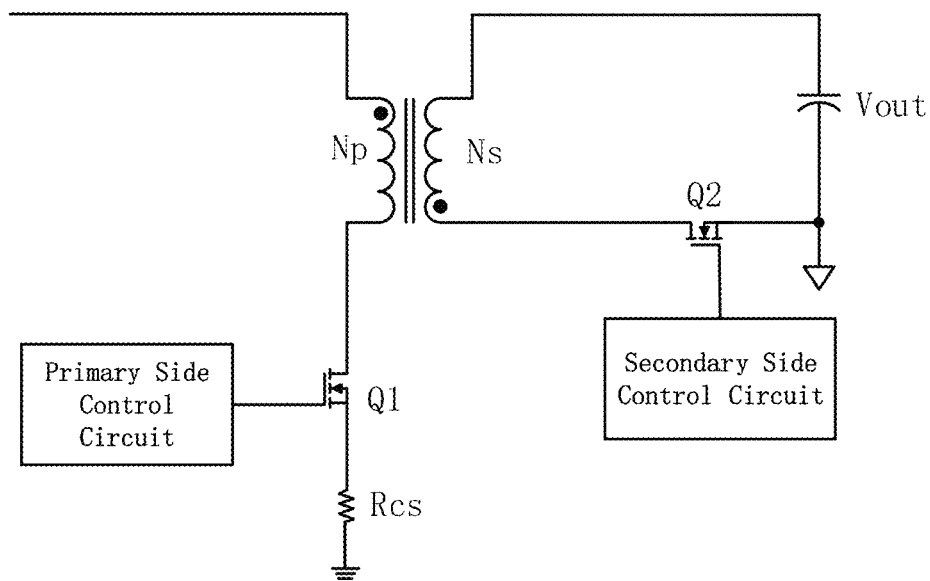
FIG. 1 illustrates a circuit diagram of a flyback converter according to a prior art example.
Figure 2:
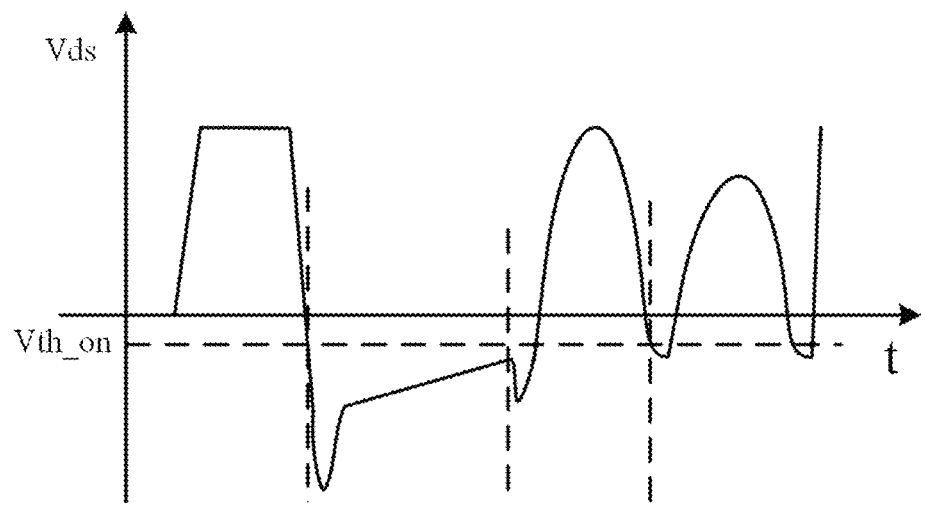
FIG. 2 illustrates a waveform diagram showing the voltage difference between two ends of a synchronous rectification transistor according to an embodiment of the present application.

The MOSFET as the synchronous rectification transistor is usually controlled by a driving voltage. The voltage Vds is the voltage difference between two ends of the synchronous rectification transistor, which is obtained by detecting the MOSFET. Two ends of the synchronous rectification transistor are its drain and source respectively. The switch state of the MOSFET is controlled by comparing the voltage Vds with the on-state threshold voltage Vth_on, as shown in FIG. 2. Specifically, it is considered that the body diode of the synchronous rectification transistor SR is turned on when the voltage Vds is less than the on-state threshold voltage Vth_on, and the synchronous rectification transistor SR can be controlled to turn on for normal freewheeling. Based on this control method, if the flyback converter works in DCM mode, the parasitic oscillation of the flyback converter may also give rise to the on-state of the body diode of the synchronous rectification transistor, as shown in FIG. 2. If the synchronous rectification control circuit controls the synchronous rectification transistor to be turned on at this time, it may damage the flyback converter.

In order to avoid the false conduction of synchronous rectification transistor SR caused by the parasitic oscillation of the converter in DCM mode, there are two main turn-on detection methods, including slope detection method and Toff_min shielding method. Toff_min shielding method is a way that the synchronous rectification transistor SR is not allowed to be turned on again within the time interval Toff_min after the shutdown moment of the synchronous rectification transistor SR, and the Toff_min duration usually needs to be greater than one oscillation cycle. The slope detection method is to detect the slope of the falling edge of the voltage Vds and to compare the voltage Vds with the preset threshold. If the slope of the falling edge of the voltage Vds meets the threshold condition, the synchronous rectification transistor SR is controlled to be turn-on, otherwise the synchronous rectification transistor SR is controlled to be turn-off. Due to the significant difference between the falling slope of the voltage Vds during the normal on-state of the synchronous rectification transistor SR and the falling slope of the voltage Vds during the parasitic oscillation of the converter in DCM mode, the slope detection method can well distinguish two falling slopes. The slope threshold is generally configured by external resistance or selected the fixed slope threshold. However, the falling slope of the voltage Vds varies greatly for different power supply, and the scheme of the fixed slope threshold is less applicable. The scheme of configuring the slope threshold with external resistance can increase the applicability, but needs to occupy additional chip pin. In addition, when the power supply is under no-load or light-load, the falling slope of the voltage Vds during the normal on-state of the synchronous reification transistor SR slows down. Therefore, it is difficult to distinguish the falling slope of the voltage Vds during the normal on-state from the falling slope of the voltage Vds during the parasitic oscillation of the converter in DCM mode.

Some embodiments in accordance with the present invention provide a synchronous rectification control circuit. The synchronous rectification control circuit is used to generate a driving signal to control the switch state of the synchronous rectification transistor. The switch state of the synchronous rectification transistor comprises on-state and off-state. The synchronous rectification control circuit comprises turn-on detection circuit. The turn-on detection circuit is configured to generate the turn-on signal based on the detection signal and the driving signal to control the switch state of the synchronous rectification transistor. The turn-on detection circuit includes the slope detection circuit and the threshold generation circuit. In one embodiment, the output of the synchronous rectification control circuit is coupled to the control end of the synchronous rectification transistor. In another embodiment, the synchronous rectification control circuit includes the synchronous rectification transistor. The synchronous rectification control circuit generates the driving signal to control the switch state of the synchronous rectification transistor. In one embodiment, the input of the slope detection circuit receives a detection signal representing the voltage difference between two ends of the synchronous rectification transistor. The slope detection circuit is configured to generate a slope representation signal representing the falling slope of the detection signal according to the detection signal. The voltage difference between two ends of the synchronous rectification transistor can be the voltage difference between the drain and source of the synchronous rectification transistor. In one embodiment, the detection signal can be the voltage difference between two ends of the synchronous rectification transistor. In another embodiment, the detection signal can be proportional to the voltage difference between two ends of the synchronous rectification transistor, or the detection signal has a conversion relationship with the voltage difference between two ends of the synchronous rectification transistor. The falling slope of the detection signal can be obtained according to the detection signal. In one embodiment, the slope representation signal can be the falling slope of the detection signal. In another embodiment, the slope representation signal can be proportional to the falling slope of the detection signal. In one embodiment, the slope representation signal represents the falling slope of the voltage difference between two ends of the synchronous rectification transistor. The input of the threshold generation circuit receives the driving signal. The threshold generation circuit is configured to generate the threshold signal by selecting one of threshold reference signals in accordance with the driving signal. The threshold reference signals include at least a first threshold reference signal and a second threshold reference signal. The turn-on detection circuit is used to generate the comparison result signal by comparing the slope representation signal and the threshold signal for controlling the switch state of the synchronous rectification transistor.

The synchronous rectification control circuit proposed in the present invention can be applied to a variety of different voltage conversion systems, and can adaptively generate the threshold signals suitable for different voltage conversion systems. Otherwise, the synchronous rectification control circuit proposed in the present invention can generate suitable threshold signal, and the synchronous rectification control circuit can effectively distinguish the falling slope of the voltage Vds when the synchronous rectification transistor SR is normally turned on and the falling slope of the voltage Vds when the converter works in the parasitic oscillation of DCM mode, which can ensure the normal turn-on of the synchronous rectification transistor, effectively avoid the false turn-on of the synchronous rectification transistor during parasitic oscillation in DCM mode, and improve the efficiency and reliability of the converter.

Figure 3:
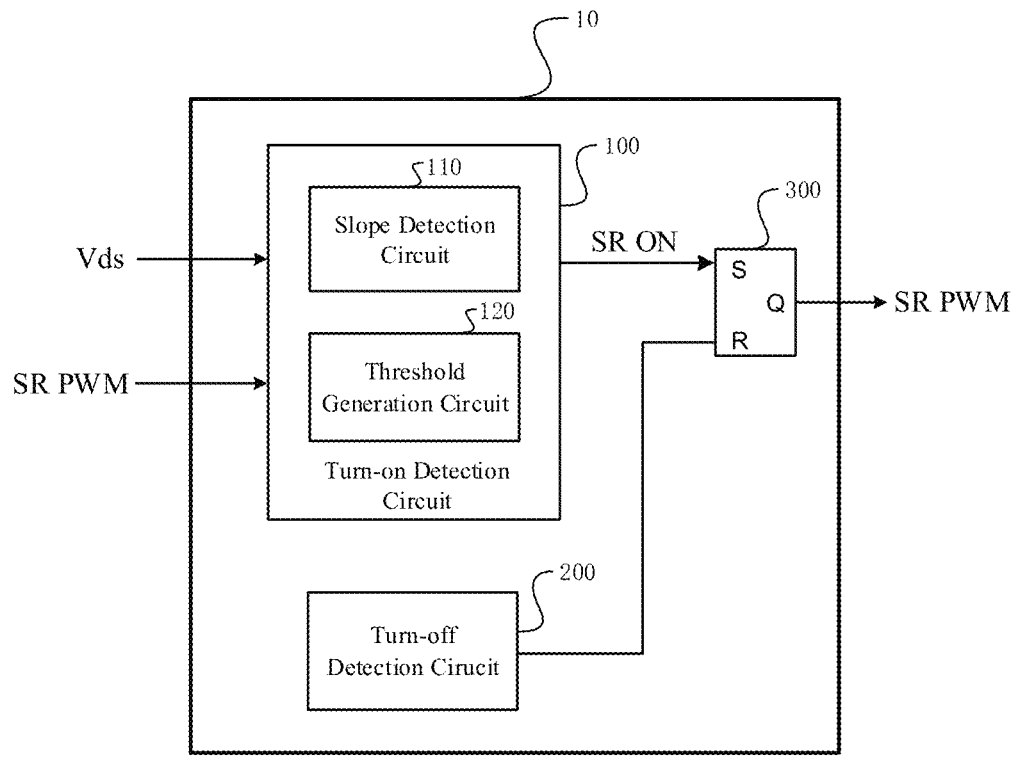
FIG. 3 illustrates a circuit diagram of a synchronous rectification control circuit according to an embodiment of the present application.

In one embodiment, as shown in FIG. 3, the synchronous rectification control circuit 10 includes the turn-on detection circuit 100, the turn-off detection circuit 200 and the trigger circuit 300. The first input of the turn-on detection circuit 100 receives the voltage difference Vds between two ends of the synchronous rectification transistor. The second input of the turn-on detection circuit 100 receives the driving signal SR PWM of the synchronous rectification transistor SR. The output of the turn-on detection circuit 100 is coupled to the set end of the trigger circuit 300. The input of the turn-off detection circuit 200 is coupled to the protection circuit in the synchronous rectification control circuit 10. The output of the turn-off detection circuit 200 is coupled to the set end of the trigger circuit 300. When the synchronous rectification control circuit 10 triggers the overvoltage protection or overcurrent protection, the turn-off detection circuit 200 will control the synchronous rectification transistor SR to be turn-off to ensure the normal operation of the synchronous rectification control circuit and the flyback converter. The output of the trigger circuit 300 is coupled to the output of the synchronous rectification control circuit 10, and the output of the synchronous rectification control circuit 10 outputs a driving signal SR PWM to drive the synchronous rectification transistor SR. The turn-on detection circuit 100 comprises a slope detection circuit 110 and a threshold generation circuit 120. The input of the slope detection circuit 110 receives the voltage difference Vds between two ends of the synchronous rectification transistor, and the slope detection circuit 110 is configured to generate the slope representation signal representing the falling slope of the voltage difference Vds between two ends of the synchronous rectification transistor according to the voltage difference Vds. The input of threshold generation circuit 120 obtains the driving signal SR PWM. The threshold generation circuit 120 is configured to generate the threshold signal by selecting one of threshold reference signals according to the driving signal SR PWM. The threshold reference signal includes a first threshold reference signal and a second threshold reference signal. The turn-on detection circuit 100 is configured to generate a comparison result signal SR ON by comparing the slope representing signal and the threshold signal to control the switch state of the synchronous rectification transistor SR.

In another embodiment, the synchronous rectification control circuit comprises a turn-on detection circuit, a turn-off detection circuit and a RS trigger. The output of the turn-on detection circuit is coupled to the set end of the RS trigger. The output of the turn-off circuit is coupled to the reset end of the RS trigger. The output of the RS trigger is coupled to the output of the synchronous rectification control circuit. In one embodiment, the turn-on detection circuit outputs a first level signal (e.g., a logic High signal) to control the RS trigger in the set state, so as to control the synchronous rectification transistor SR in the on-state. The turn-off detection circuit outputs a second level signal (e.g., a logic Low signal) to control the RS trigger in the reset state, so as to control the synchronous rectification transistor SR in the off-state.

Figure 4:
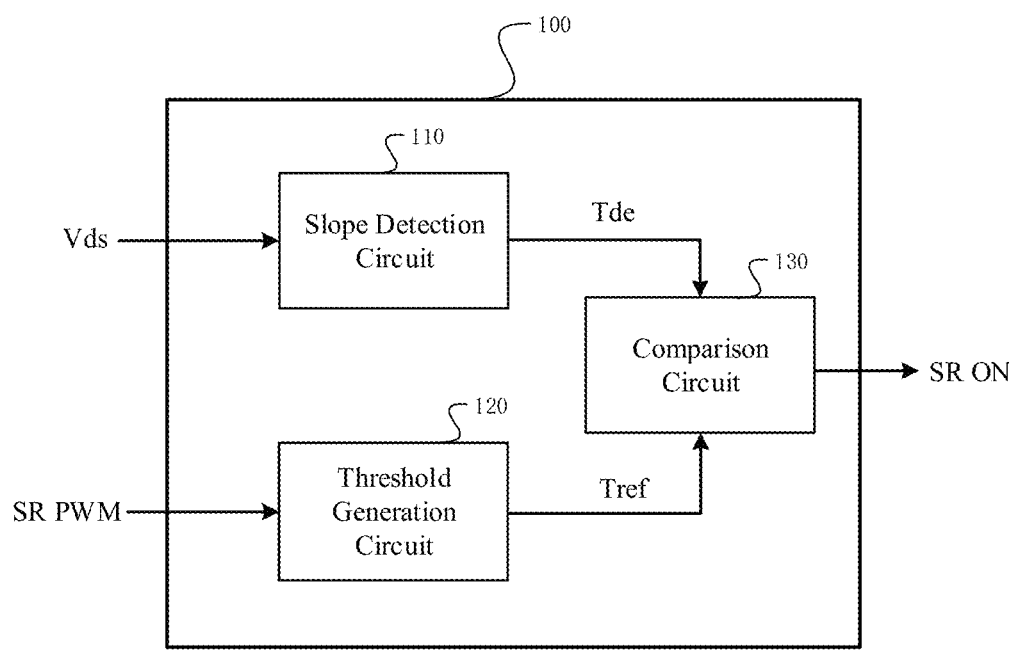
FIG. 4 illustrates a circuit diagram of a turn-on detection circuit according to an embodiment of the present application.

In one embodiment, as shown in FIG. 4, the turn-on detection circuit 100 comprises a slope detection circuit 110, a threshold generation circuit 120 and a comparison circuit 130. The input of the slope detection circuit 110 receives the voltage difference Vds between two ends of the synchronous rectification transistor. The output of the slope detection circuit is coupled to the first input of the comparison circuit 130. The slope detection circuit 110 generates a slope representation signal representing the falling slope of the detection signal according to the voltage difference between two ends of the synchronous rectification transistor. In an embodiment, the slope detection circuit 110 obtains the time interval required for the voltage difference Vds to change the set voltage value, and the signal representing the time interval is taken as the slope representing signal. The time interval can represent the falling slope of the detection signal. In an embodiment, the signal representing the time interval can be a time interval Tde. In another embodiment, the signal representing the time interval can be a signal which is proportional to or converted by the time interval. As shown in FIG. 4, the input of the threshold generation circuit 120 obtains the driving signal SR PWM of the synchronous rectification transistor SR. The threshold generation circuit 120 is configured to generate the threshold signal by selecting one of threshold reference signals according to the driving signal SR PWM. In one embodiment, the threshold signal is the time interval Tref, and the comparison circuit 130 generates the comparison result signal SR ON by comparing the time interval Tde and the time signal Tref, so as to control the switch state of the synchronous rectification transistor SR.

In another embodiment, the slope detection circuit gets the voltage variation of the detection signal within the set time, and takes the signal representing the voltage variation as the slope representation signal. The voltage variation can represent the falling slope of the detection signal. In one embodiment, the signal representing the voltage variation can be the voltage variation Vde. In another embodiment, the signal representing the voltage variation can be a signal which is proportional to or converted by the voltage variation. In an embodiment, the threshold signal is the voltage signal Vref, and the comparison circuit generates the comparison result signal SR ON by comparing the voltage variation Vde and voltage signal Vref for the purpose of controlling the switch state of the synchronous rectification transistor SR.

Figure 5:
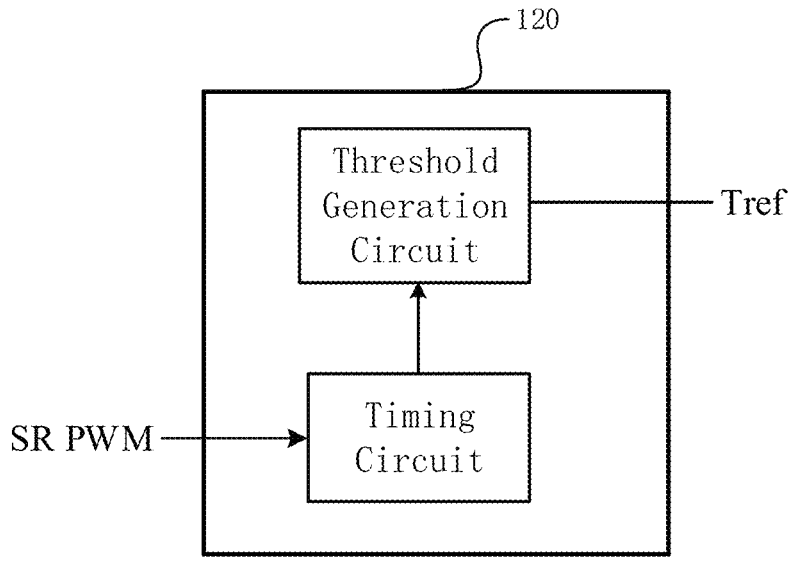
FIG. 5 illustrates a circuit diagram of a threshold generation circuit according to an embodiment of the present application.

In one embodiment, as shown in FIG. 5, the threshold generation circuit 120 comprises a threshold output circuit and a timing circuit. The input of the timing circuit receives the driving signal SR PWM of the synchronous rectification transistor SR. The output of the timing circuit is coupled to the input of the threshold output circuit, and the output of threshold output circuit outputs the threshold signal. In an embodiment, the timing circuit performs timing in accordance with the driving signal SR PWM to get the timing time. The threshold reference signal comprises the first threshold reference signal and the second threshold reference signal. The threshold generation circuit comprises the threshold output circuit. The threshold output circuit selects the first threshold reference signal or the second threshold reference signal as the threshold signal according to the timing time. The threshold output circuit outputs the threshold signal. In one embodiment, the threshold signal is the time signal Tref. In another embodiment, the threshold signal is the voltage signal Vref.

Figure 6:
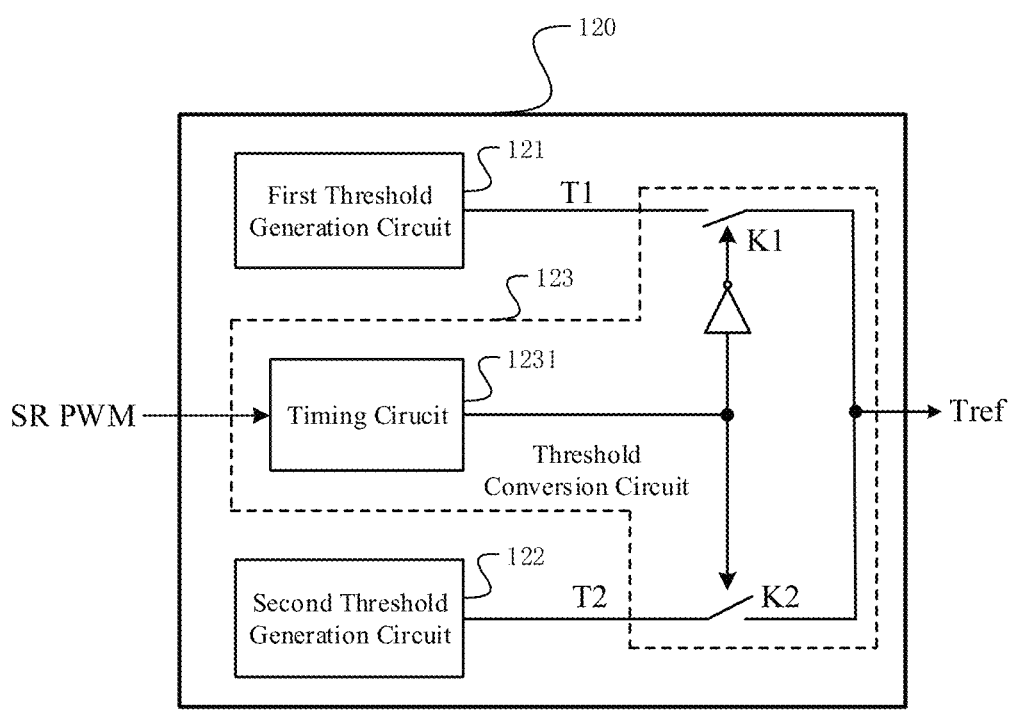
FIG. 6 illustrates a circuit diagram of a threshold generation circuit according to another embodiment of the present application.

In one embodiment, as shown in FIG. 6, the threshold generation circuit 120 comprises the first threshold generation circuit 121, the second threshold generation circuit 122 and the threshold conversion circuit 123. The threshold conversion circuit 123 includes the timing circuit 1231, the first switch K1, the second switch K2 and the inverter. The output of the first threshold generation circuit 121 is coupled to the first end of the first switch K1, and the first threshold generation circuit 121 is configured to generate the first threshold reference signal T1. The output of the second threshold generation circuit 122 is coupled to the first end of the second switch K2, and the second threshold generation circuit 122 is configured to generate the second threshold reference signal T2. The second end of the first switch K1 is coupled to the output of the threshold generation circuit. The second end of the second switch K2 is coupled to the output of the threshold generation circuit. The input of the timing circuit 1231 receives the driving signal SR PWM. The output of the timing circuit 1231 is respectively coupled to the input of the inverter and the control end of the second switch K2, and the output of the inverter is coupled to the control end of the first switch K1. In another embodiment, the output of the timing circuit is respectively coupled to the input of the inverter and the control end of the first switch K1, and the output of the inverter is coupled to the control end of the second switch K2. The timing circuit is used for timing according to the driving signal SR PWM to obtain the timing time. When the timing time doesn't meet the set condition, the timing circuit controls the first switch K1 to be turn-on and the second switch K2 to be turn-off. The threshold signal Tref output by the threshold generation circuit 120 is the first threshold reference signal. When the timing time meets the set condition, the timing circuit controls the first switch K1 to be turn-off and the second switch K2 to be turn-on. The threshold signal Tref output by the threshold generation circuit 120 is the second threshold reference signal. In one embodiment, when the timing time is less than the set time, the threshold signal output by the threshold generation circuit 120 is the first threshold reference signal. When the timing time is equal to or greater than the preset time, the threshold signal generated by the threshold generation circuit 120 is the second threshold reference signal. In an embodiment, both the first threshold reference signal and the second threshold reference signal are the time signal. In another embodiment, both the first threshold reference signal and the second threshold reference signal are the voltage signal.

Figure 7:
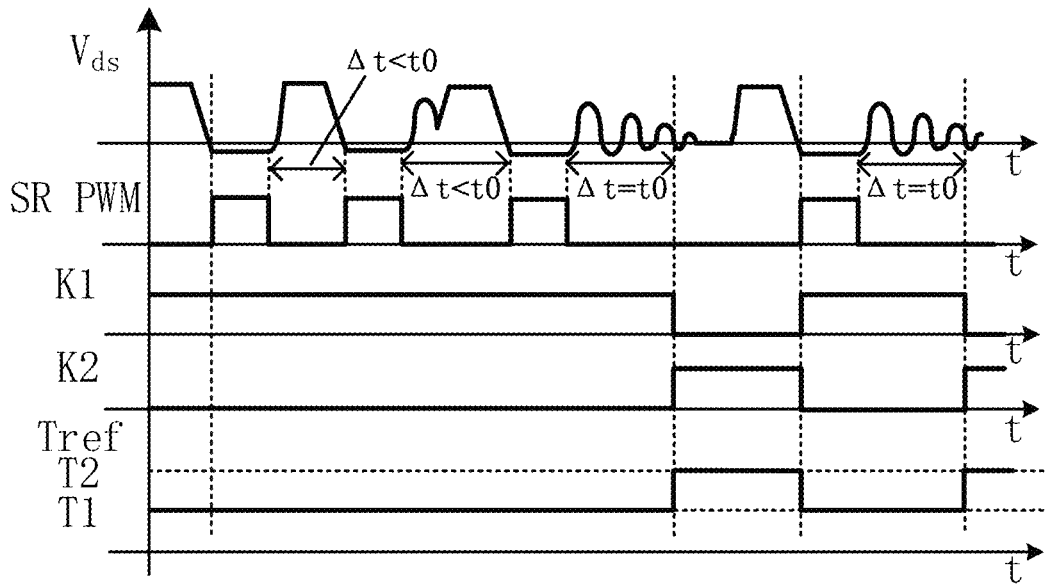
FIG. 7 illustrates a waveform diagram showing the signals of a flyback converter to an embodiment of the present application.

In an embodiment, as shown in FIG. 6 and FIG. 7, the timing circuit starts timing at the falling edge of the driving signal SR PWM. The timing circuit ends timing at the rising edge of the driving signal SR PWM and then resets the timing. The timing time is obtained by timing of the timing circuit. When the timing time Δt is less than the preset time t0, the threshold generation circuit controls the first switch K1 to be turn-on and the second switch K2 to be turn-off, and the threshold signal Tref output by the threshold generation circuit is the first threshold reference signal T1. When the timing time Δt reaches the preset time t0, the first switch K1 is controlled to be turn-off and the second switch K2 is controlled to be turn-on, and the threshold signal Tref output by the threshold generation circuit is the second threshold reference signal T2. In one embodiment, the threshold signal Tref output by the threshold generation circuit is the second threshold reference signal T2 from the time when the timing time of the timing circuit reaches the preset time t0 to the time when the rising edge of the driving signal SR PWM of the next switch cycle arrives. The threshold generation circuit controls the threshold signal to switch between the first threshold reference signal T1 and the second threshold reference signal T2 in accordance with the driving signal SR PWM.

In an embodiment, as shown in FIG. 7, in the initial working stage (e.g. the startup stage) of the synchronous rectification control circuit, the threshold signal output by the threshold generation circuit is the first threshold reference signal T1. At that time, the first switch K1 is controlled to be turn-on and the second switch K2 is controlled to be turn-off, so as to ensure that the synchronous rectification transistor can be turn-on normally and the false turn-on will not be triggered in case of the parasitic oscillation of the circuit in DCM mode. The falling edge signal of the driving signal SR PWM enables the timing circuit to time after the first turn-on cycle of the driving signal ends. If the rising edge of the driving signal SR PWM arrives within the preset time, the threshold signal output by the threshold generation circuit of the threshold generation circuit is still the first threshold reference signal T1, and the timing circuit is reset when the rising edge of the driving signal SR PWM arrives. If the timing circuit reaches the preset time t0, the timing circuit controls the first switch K1 to be turn-off and the second switch K2 to be turn-on, and the switch states of the first switch K1 and the second switch K2 are maintained to the next rising edge of the driving signal SR PWM. The threshold signal output by the threshold generation circuit of the threshold generation circuit is the second threshold reference signal T2 at that time period. At the next rising edge of the driving signal SR PWM, the threshold generation circuit controls the first switch K1 to be turn-on and the second switch K2 to be turn-off, and the timing circuit is reset. At the next falling edge of the driving signal SR PWM, the timing circuit starts the next timing process. The embodiment as shown in FIG. 7, the threshold signal is the time signal. In another embodiment, the threshold signal is the voltage signal.

In one embodiment, the threshold signal is the time signal. When the slope representation signal is less than the threshold signal, the synchronous rectification control circuit controls the synchronous rectification transistor to be turn-on. In another embodiment, the threshold signal is the voltage signal. When the slope representation signal is greater than the threshold signal, the synchronous rectification control circuit controls the synchronous rectification transistor to be turn-on.

In an embodiment, the threshold signal is the time signal, and the first threshold reference signal is less than the second threshold reference signal. When the converter is in the state of no-load or light load, the falling edge (i.e. the falling slope) of voltage Vds slows down when the synchronous rectification transistor SR is normally turned on. At that time, the synchronous rectification control circuit can control the threshold generation circuit to output the threshold signal, and the threshold signal is the second threshold reference signal. In another embodiment, the threshold signal is the voltage signal, the first threshold reference signal is greater than the second threshold reference signal. When the converter is in the state of no-load or light load, the falling edge (i.e. the falling slope) of voltage Vds slows down when the synchronous rectification transistor SR is normally turned on. At that time, the synchronous rectification control circuit can control the threshold generation circuit to output the threshold signal, and the threshold signal is the second threshold reference signal.

An embodiment also discloses a flyback converter, the flyback converter comprises the primary side circuit and the secondary side circuit. The primary side circuit is coupled to the input voltage. The primary side circuit includes the primary side winding and the primary side control circuit. The primary side control circuit is configured to control the switch state of the switch transistor of the primary side. The secondary side circuit comprises the secondary side winding and a synchronous rectification control circuit as described in any one of the above items, and the synchronous rectification control circuit is used for controlling the switch state of the synchronous rectification transistor. The primary side winding and the secondary side winding are coupled to form the transformer.

Figure 8:
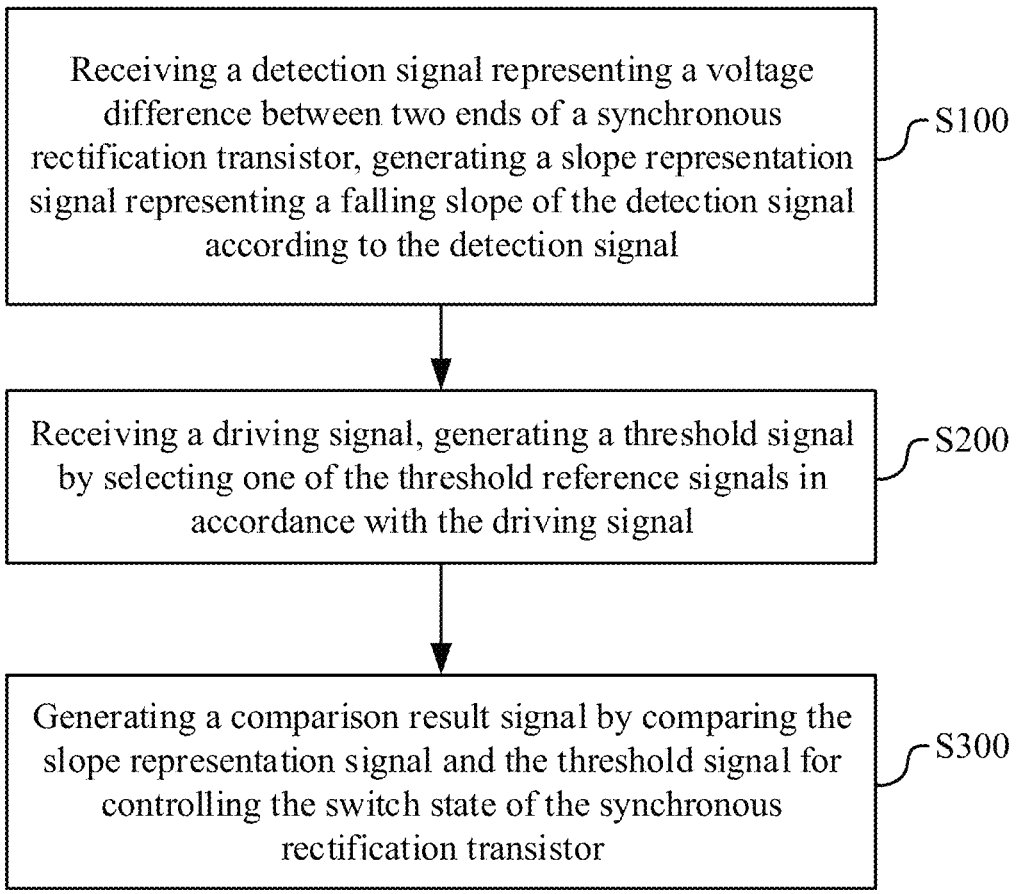
FIG. 8 illustrates a flow chart of a synchronous rectification control method according to an embodiment of the present application.

In yet another embodiment, the embodiment also discloses a synchronous rectification control method. As shown in FIG. 8, the synchronous rectification control method comprises: receiving a detection signal representing a voltage difference between two ends of a synchronous rectification transistor, generating a slope representation signal representing a falling slope of the detection signal according to the detection signal; receiving a driving signal, generating a threshold signal by selecting one of threshold reference signals in accordance with the driving signal, the threshold reference signals include at least a first threshold reference signal and a second threshold reference signal; and generating a comparison result signal by comparing the slope representation signal and the threshold signal for controlling the switch state of the synchronous rectification transistor.

In one embodiment, the synchronous rectification control circuit is configured to generate a driving signal for controlling the switch state of the synchronous rectification transistor. The synchronous rectification control circuit includes the turn-on detection circuit. The turn-on detection circuit comprises the slope detection circuit and the threshold generation circuit. The slope detection circuit receives the detection signal representing the voltage difference between two ends of the synchronous rectification transistor, and the slope detection circuit generates the slope representation signal representing the falling slope of the detection signal in accordance with the detection signal. The threshold generation circuit receives the driving signal. The threshold generation circuit is configured to generate the threshold signal by selecting one of threshold reference signals in accordance with the driving signal. The threshold reference signal includes a first threshold reference signal and a second threshold reference signal. The turn-on detection circuit generates a comparison result signal by comparing the slope representation signal and the threshold signal for controlling the switch state of the synchronous rectification transistor.

In another embodiment, the step of generating a threshold signal by selecting one of threshold reference signals in accordance with the driving signal includes getting the timing time by timing in accordance with the driving signal, and generating the threshold signal by selecting the threshold reference signal according to the timing time.

In an embodiment, the step of generating the slope representation signal representing the falling slope of the detection signal according to the detection signal includes obtaining the voltage variation of the detection signal within the set time, and taking the signal representing the voltage variation as the slope representation signal.

In another embodiment, the step of generating the slope representation signal representing the falling slope of the detection signal according to the detection signal includes obtaining the time interval required for the detection signal to change the set voltage value, and taking the signal representing the time interval as the slope representing signal.

In an embodiment, the threshold signal is the time signal. When the slope representation signal is less than the threshold signal, the synchronous rectification transistor is turned on. In another embodiment, the threshold signal is the voltage signal. When the slope representation signal is greater than the threshold signal, the synchronous rectification transistor is turned on.

In one embodiment, when the timing time is less than the preset time, the threshold signal is the first threshold reference signal. When the timing time reaches the preset time, the threshold signal is the second threshold reference signal.

In one embodiment, the synchronous rectification control method further includes starting timing at the falling edge of the driving signal, and ending timing at the rising edge of the driving signal and then resetting the timing.

In an embodiment, the threshold signal is the time signal, and the first threshold reference signal is less than the second threshold reference signal. In another embodiment, the threshold signal is the voltage signal, and the first threshold reference signal is greater than the second threshold reference signal.

It will be appreciated by persons skilled in the art that the present invention is not limited to what has been particularly shown and described herein above. Rather the scope of the present invention is defined by the claims and includes both combinations and sub-combinations of the various features described herein above as well as variations and modifications thereof which would occur to persons skilled in the art upon reading the foregoing description and which are not in the prior art.

We claim:

1. A synchronous rectification control circuit configured to generate a driving signal for controlling a switch state of a synchronous rectification transistor, the synchronous rectification control circuit comprises a turn-on detection circuit, the turn-on detection circuit comprising:
    a slope detection circuit having an input and an output, the input of the slope detection circuit configured to receive a detection signal representing a voltage difference between two ends of the synchronous rectification transistor, the slope detection circuit configured to generate a slope representation signal representing a falling slope of the detection signal according to the detection signal; and
    a threshold generation circuit having an input and an output, the input of the threshold generation circuit configured to receive the driving signal, the threshold generation circuit configured to generate a threshold signal by selecting one of threshold reference signals in accordance with the driving signal, wherein the threshold reference signals include at least a first threshold reference signal and a second threshold reference signal;
    wherein the turn-on detection circuit is configured to generate a comparison result signal by comparing the slope representation signal and the threshold signal for controlling the switch state of the synchronous rectification transistor.

2. The synchronous rectification control circuit according to claim 1, wherein the threshold generation circuit comprises a timing circuit, and wherein an input of the timing circuit is configured to receive the driving signal; and the timing circuit is configured to obtain a timing time by timing according to the driving signal, the threshold generation circuit is configured to generate the threshold signal in accordance with the timing time.

3. The synchronous rectification control circuit according to claim 1, wherein the slope detection circuit obtains a voltage variation of the detection signal within a set time and takes a signal representing the voltage variation as the slope representation signal.

4. The synchronous rectification control circuit according to claim 1, wherein the slope detection circuit obtains a time interval required for the detection signal to change a set voltage value and takes a signal representing the time interval as the slope representation signal.

5. The synchronous rectification control circuit according to claim 2, wherein when the timing time is less than a preset time, the threshold signal generated by the threshold generation circuit is the first threshold reference signal; and when the timing time reaches the preset time, the threshold signal generated by the threshold generation circuit is the second threshold reference signal.

6. The synchronous rectification control circuit according to claim 2, wherein the threshold generation circuit further comprises:
a first threshold generation circuit having an output, the output of the first threshold generation circuit coupled to a first end of a first switch, the first threshold generation circuit configured to generate the first threshold reference signal;
a second threshold generation circuit having an output, the output of the second threshold generation circuit coupled to a first end of a second switch, the second threshold generation circuit configured to generate the second threshold reference signal;
the first switch having a control end, a first end and a second end, the second end of the first switch coupled to the output of the threshold generation circuit;
the second switch having a control end, a first end and a second end, the second end of the second switch coupled to the output of the threshold generation circuit; and
the timing circuit having an input and an output, the input of the timing circuit configured to receive the driving signal, the output of the timing circuit respectively coupled to the control end of the first switch and the control end of the second switch;
wherein an inverter is coupled between the timing circuit and the first switch, or the inverter is coupled between the timing circuit and the second switch.

7. The synchronous rectification control circuit according to claim 2, wherein the timing circuit starts timing at a falling edge of the driving signal, and the timing circuit ends timing at a rising edge of the driving signal and then resets the timing.

8. The synchronous rectification control circuit according to claim 5, the threshold signal is a time signal, and the first threshold reference signal is less than the second threshold reference signal; or the threshold signal is a voltage signal, and the first threshold reference signal is greater than the second threshold reference signal.

9. A flyback converter, comprising a primary side circuit and a secondary side circuit, wherein the secondary side circuit comprises a secondary side winding and the synchronous rectification control circuit of claim 1.

10. A synchronous rectification control method, comprising:
receiving a detection signal representing a voltage difference between two ends of a synchronous rectification transistor, generating a slope representation signal representing a falling slope of the detection signal according to the detection signal;
receiving a driving signal, generating a threshold signal by selecting one of threshold reference signals in accordance with the driving signal, the threshold reference signals include at least a first threshold reference signal and a second threshold reference signal; and
generating a comparison result signal by comparing the slope representation signal and the threshold signal for controlling the switch state of the synchronous rectification transistor.

11. The synchronous rectification control method according to claim 10, the step of generating a threshold signal by selecting one of threshold reference signals in accordance with the driving signal comprises:
getting a timing time by timing in accordance with the driving signal, and generating the threshold signal by selecting the threshold reference signal according to the timing time.

12. The synchronous rectification control method according to claim 10, wherein the step of generating a slope representation signal representing a falling slope of the detection signal according to the detection signal comprises:
obtaining a voltage variation of the detection signal within a set time and taking a signal representing the voltage variation as the slope representation signal.

13. The synchronous rectification control method according to claim 10, wherein the step of generating a slope representation signal representing a falling slope of the detection signal according to the detection signal comprises:
obtaining a time interval required for the detection signal to change a set voltage value, and taking a signal representing the time interval as the slope representing signal.

14. The synchronous rectification control method according to claim 10, wherein the threshold signal is a time signal, when the slope representation signal is less than the threshold signal, the synchronous rectification transistor is turned on.

15. The synchronous rectification control method according to claim 10, wherein the threshold signal is a voltage signal, and when the slope representation signal is greater than the threshold signal, the synchronous rectification transistor is turned on.

16. The synchronous rectification control method according to claim 11, wherein when the timing time is less than a preset time, the threshold signal is the first threshold reference signal; and when the timing time reaches the preset time, the threshold signal is the second threshold reference signal.

17. The synchronous rectification control method according to claim 11, further comprising:
starting timing at a falling edge of the driving signal, and ending timing at a rising edge of the driving signal and then resetting the timing.

18. The synchronous rectification control method according to claim 16, wherein the threshold signal is a time signal, and the first threshold reference signal is less than the second threshold reference signal.

19. The synchronous rectification control method according to claim 16, wherein the threshold signal is a voltage signal, and the first threshold reference signal is greater than the second threshold reference signal.

\* \* \* \* \*